United States Patent
Ching et al.

[11] Patent Number: 6,057,013
[45] Date of Patent: May 2, 2000

[54] OXYGEN SCAVENGING SYSTEM INCLUDING A BY-PRODUCT NEUTRALIZING MATERIAL

[75] Inventors: Ta Yen Ching, Novato; Joseph L. Goodrich, Lafayette; Kiyoshi Katsumoto, El Cerrito, all of Calif.

[73] Assignee: Chevron Chemical Company, San Ramon, Calif.

[21] Appl. No.: 08/612,510

[22] Filed: Mar. 7, 1996

[51] Int. Cl.[7] ............ B32B 27/08; B32B 27/18; B29D 22/00; B65D 30/08
[52] U.S. Cl. .......... 428/35.7; 428/518; 428/36.7; 428/35.9; 428/462; 426/398
[58] Field of Search ............... 428/463, 480, 428/473.5, 411.1, 474.4, 36.7, 35.8, 36.6, 35.9, 518, 35.4, 689, 462, 35.2, 35.7; 524/204, 260; 426/398; 252/188.28

[56] References Cited

U.S. PATENT DOCUMENTS

| | | | |
|---|---|---|---|
| 5,153,038 | 10/1992 | Koyama et al. | 428/35.8 |
| 5,211,875 | 5/1993 | Speer et al. | 252/188.28 |
| 5,246,753 | 9/1993 | Koyama et al. | 428/36.7 |
| 5,284,892 | 2/1994 | Brodie, III et al. | 524/251 |
| 5,340,884 | 8/1994 | Mills et al. | 125/420 |
| 5,492,742 | 2/1996 | Zenner et al. | 428/35.2 |
| 5,529,833 | 6/1996 | Speer et al. | 428/215 |
| 5,660,761 | 8/1997 | Katsumoto et al. | 252/188.28 |
| 5,744,246 | 4/1998 | Ching et al. | 428/474.4 |

FOREIGN PATENT DOCUMENTS

| | | | |
|---|---|---|---|
| 367835A1 | 5/1990 | European Pat. Off. | |
| 0408275 A2 | 1/1991 | European Pat. Off. | |
| 424855A1 | 5/1991 | European Pat. Off. | |
| 454437A1 | 10/1991 | European Pat. Off. | |
| 507207A2 | 10/1992 | European Pat. Off. | |
| 0 367 390 B1 | 1/1994 | European Pat. Off. | A23L 3/3436 |
| 0 370 802 B1 | 3/1994 | European Pat. Off. | B65D 81/24 |
| 0 366 245 B1 | 12/1994 | European Pat. Off. | H01J 29/50 |
| 0 638 487 | 2/1995 | European Pat. Off. | |
| 0 720 821 | 7/1996 | European Pat. Off. | |
| 0 464 782 B1 | 10/1996 | European Pat. Off. | B32B 27/18 |
| 05247276 | 9/1993 | Japan | C08L 23/02 |
| 06023925 | 2/1994 | Japan | B32B 27/32 |
| 7-067594 | 3/1995 | Japan . | |
| 93/01049 | 1/1993 | WIPO | B32B 9/04 |

*Primary Examiner*—Deborah Jones
*Assistant Examiner*—Michael LaVilla
*Attorney, Agent, or Firm*—Marianne H. Michel; W. Bradley Haymond; Williams, Morgan & Amerson, P.C.

[57] ABSTRACT

Provided is a system useful for oxygen scavenging which comprises at least two components, i.e., an oxygen scavenging material which forms at least one by-product upon reaction thereof with oxygen, and an effective amount of a neutralizing material capable of neutralizing at least a portion of these by-products. In a preferred application, a multi-layer structure that can be employed in producing packages and in particular food packages, comprises a first layer including an oxygen scavenging material and a second layer which includes a material that is capable of neutralizing at least a portion of the by-products produced by the oxidation of the oxygen scavenging material within the first layer. These two layers are arranged such that, upon formation of the package, the second layer is interior to the first layer. Furthermore, the multi-layer film can include one or more of an oxygen barrier layer, a polymeric selective barrier layer, and a heat-sealable layer.

17 Claims, 1 Drawing Sheet

OXYGEN SCAVENGING SYSTEM INCLUDING A BY-PRODUCT NEUTRALIZING MATERIAL

BACKGROUND OF THE INVENTION

The present invention relates to an improved oxygen scavenging system for use with oxygen sensitive materials, e.g., food, which system finds particular utility in the multi-layer films that includes an oxygen scavenging layer.

Oxygen scavenging materials have been developed partly in response to the food industry's needs of having longer shelf-life and better flavor preservation for packaged food.

These oxygen scavenging materials constitute at least a portion of the food package, and these materials remove oxygen which surrounds the food product, e.g., the residue oxygen in a package after sealing or air which has leaked into the package, thereby inhibiting spoilage of the food.

One method which is currently being employed involves the use of "active packaging" where the food product package is modified in some way to control the exposure of the food product to oxygen. Such "active packaging" can include sachets containing compositions, e.g., iron-based compositions such as Ageless® which scavenges oxygen in the package through an oxidation reaction. However, sachets are not advantageous for a variety of reasons not the least of which is the problems caused by the accidental ingestion of the sachets or the material present therein.

Recent attempts have involved incorporating an oxygen scavenger into the package structure itself. In such an arrangement, oxygen scavenging materials constitute at least a portion of the food package. One example of such an arrangement comprises a scavenging wall which includes inorganic powders and/or salts. See, for example, European Applications 367,835; 366,245; 367,390; and 370,802. However, such composition is difficult, if not impossible, to adequately process and thereby is not considered commercially feasible.

In another more promising arrangement, oxygen scavenging materials can be low molecular-weight oligomers that are typically incorporated into processable packaging polymers or can be oxygen scavenging polymers in which either the backbone is designed to break apart when the polymer reacts with oxygen or in which, initially at least, pendant oxidizable side chains react with oxygen.

Other methods which have been disclosed include that of European Patent Application 0454437, wherein an oxygen absorbent composition is disclosed. The composition contains a linear hydrocarbon polymer having one or more unsaturated groups or a mixture of linear hydrocarbon polymers having one or more unsaturated groups with an unsaturated fatty acid compound and an oxidation promoter as essential components. And, optionally, the composition can contain a basic substance and/or an adsorption substance.

European Patent Application 0424855 discloses an inhibitor parcel comprising a composition containing an unsaturated fatty acid compound as its main ingredient and a permeable diffusing parceling material prepared by laminating and bonding an oxygen permeable resin layer onto one side of a base sheet made of a fibrous material and an adhesive, and then laminating and bonding thereunto an oxygen permeable resin layer, and then laminating and bonding a porous film of a low softening point resin or a low softening point unwoven fabric onto the other side of the base sheet. The parcel is directed to preserving electronic devices and electronic parts and excluding oxygen as well as water.

Systems have also been designed to control odors which can be generated by deterioration of the contents (food) being stored, or deterioration of the film packaging used in storing the contents. For example, in Japanese Kokai Patent No. HEI6-223925, published Feb. 1, 1994, a deodorant packaging film is described. The packaging film is obtained by constructing a film having inner and outer surface layers of polypropylene resin that contains a polybutene or polyisobutylene, tackifier, and deodorant and constructing the middle layer from polyethylene terephthalate or a polyamide resin. The deodorant component of the polypropylene resin composition is described as being flavonoid deodorants, polyphenol components containing deodorants, deodorants that have turpentine oil as a major component, and deodorants based on organic acids.

U.S. Pat. No. 5,340,884 discloses a polyester/polyamide blend having an excellent gas barrier property and an improved flavor retaining property. In particular, the polyethylene terephthalate/low molecular weight polyamide blend reduces the concentration of acid aldehyde contained in the polyester, thereby rendering the blend more suitable for the storage of food.

U.S. Pat. No. 5,284,892 describes a system which is an aldehyde scavenging composition. Such compositions are useful in producing packaging films for oil containing foods, which give off aldehydes. The compositions comprises a polyalkylene imine and a polyolefin polymer. See also U.S. Pat. No. 5,362,784.

International Publication No. WO 93/01049 discloses a packaging composition that helps to extend shelf life of oil containing foods by absorbing undesirable aldehydes that are produced during oil degradation. The composition suggested to be used in absorbing the aldehydes are primary and/or secondary amine groups and strong inorganic bases.

European Patent Application 0504726 discloses a food preserving agent which comprises an oxygen absorbent and a substance which is able to remove acetaldehyde.

European Patent Application 0464782 is directed to a multi-layer thermoplastic film having a vinylidine chloride polymer barrier and at least a polyolefin second layer laminated to the barrier. Upon irradiation of the barrier layer, odor is generated due to ionizing irradiation of the barrier layer. Hydrotalcite is blended with the polyolefin in order to substantially reduce the odor generated by the vinylidine chloride copolymer barrier.

Japanese Kokai HEI5-247276 discloses an oxygen barrier resin composition. The oxygen barrier resin composition comprises a polyolefin, an oxidation catalyst and an odor absorbent. The odor absorbent is used to suppress the odor caused by oxidation of the polyolefin. As suitable absorbents, there are mentioned natural zeolite, synthetic zeolite, silica gel, activated carbon, activated clay, activated aluminum oxide, magnesium silicate, aluminum silicate and the like. Synthetic hydrotalcite type compounds can also be used.

A major problem that still needs to be addressed, however, is that a wide variety of organic compounds are produced upon oxidation of the oxygen scavenging material. Many of these oxidation products can migrate from the layer carrying an oxygen scavenging material and enter the air surrounding the food or even enter the food itself.

Such oxidation products can have foul odors or can even be compounds that are undesirable. It is therefore highly desirable to provide a way to prevent such oxidation products from entering a packaged volume that contains food.

One attempt to solve the problem of migration of oxidation products involves the use of a composition comprising two layers, where one layer carries an oxygen scavenging material and one layer is a barrier situated between the packaged volume and the layer carrying an oxygen scavenging material. See U.S. application Ser. No. 08/304,303, filed Sep. 12, 1994, now abandoned, which is incorporated herein by reference for all purposes.

One problem with this approach is that many barriers are capable of blocking the migration of molecules of certain sizes, but they fail in blocking very small organic molecules. On the other hand, there are good barriers which are effective to block the migration of small oxidation products into, e.g., the enclosed volume of the package, but they also slow the oxygen migrating from the enclosed volume to the organic scavenging material.

Other multi-layer film packaging materials are also recognized within the art. Such films can include, in addition to the layers discussed above, a "polymeric selective barrier layer" such as that described in U.S. application Ser. No. 08/304,303, filed Sep. 12, 1994 now abandoned. While such selective barrier layers can prevent the migration of certain, in fact many, of the undesirable oxidation products, certain by-products, and in particular, those having a smaller molecular size may not be effectively blocked. This is particularly true for those by-products which are of a similar or slightly larger size to gaseous oxygen.

Thus, the need still exists for an improved system for protecting oxygen sensitive materials, and in particular a system applicable to multi-layer film for use in food packaging which is capable of neutralizing such molecules, thereby reducing those problems associated with these by-products as discussed above.

SUMMARY OF THE INVENTION

Among other aspects, this invention is based upon the surprising discovery that an oxygen scavenging system, particularly one useful in films, can be improved through the use of oxidation by-product neutralizing materials in a separate layer. By a "neutralizing" material is meant a material which can react with, complex with and overall eliminate the troublesome oxidation by-product compound. Where the by-product is an acid, it can be neutralized as in an acid/base reaction by the neutralizing material. Where the by-product is not acid, the compound can be neutralized by other understood chemical interactions with the neutralizing material of the present invention. Therefore, the term "neutralize", in the context of the present invention, is intended to be broader than the literal acid/base reaction.

In one aspect, the present invention relates to a multi-layer structure comprising:

a first layer which includes an oxygen-scavenging material which react with oxygen by way of an oxidation reaction; and a second layer including an effective amount of a neutralizing material capable of neutralizing at least a portion of the by-products of the oxidation reaction. Moreover, these two layers are preferably arranged such that the second layer is located between the first layer and the interior of the package.

Moreover, this multi-layer structure preferably further includes an oxygen barrier layer located outside of the first layer, and/or a polymeric selected barrier layer which is also located inside the first layer.

The oxygen scavenging system according to the present invention is preferably employed in a packaging environment which packaging holds an oxygen sensitive material. Such materials can include food, cosmetic/beauty materials and other chemicals, as well as electronic materials.

In the present invention, the oxygen scavenging material is preferably an organic oxygen scavenging material while the neutralizing material is preferably selected from the group consisting of inorganic bases and organic bases.

BRIEF DESCRIPTION OF THE DRAWING

The FIGURE of the Drawing illustrates one embodiment of a multi-layer film according to the present invention.

DETAILED DESCRIPTION OF THE PREFERRED EMBODIMENTS

Figure 1:
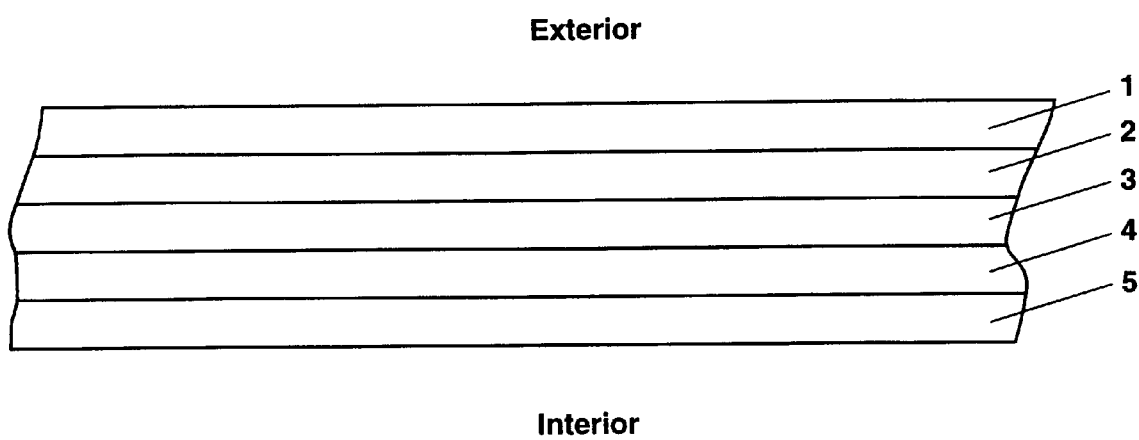

As discussed above, the oxygen scavenging system of the present invention includes two components contained in separate layers, i.e., an oxygen scavenging material, and an oxidation by-product neutralizing material. Each of these two components will now be discussed in more detail.

The first component, the oxygen scavenging material, may be any oxygen scavenging material recognized in the art. Suitable examples of such materials include unsaturated organic compounds such as carotene, ascorbic acid, squalene, or dehydrated caster oil. Suitable materials are also disclosed in EP 0 507 207.

The oxygen scavenging material is maintained in layers separate from the neutralizing material layer. This is important, as it has been found that a mixing of the two components can cause deleterious effects on the oxygen scavenging properties of the oxygen scavenger, thereby defeating the entire purpose of the system. The two components are thereby maintained in different layers, and surprisingly offers excellent oxygen scavenging properties as well as protection for the packaged material from the oxidation by-products.

This scavenging compound may be introduced in a variety of manners, depending on the ultimate use of the system. For example, it may be blended with a carrier, e.g., polymer, which itself may or may not scavenge oxygen, or it may be coated onto a material such as aluminum foil or paper or even be incorporated into a material such as paper. The oxygen scavenging material may be in localized areas on a layer, e.g., the oxygen scavenging material may be in a patch that is laminated to another layer in a multi-layer arrangement.

The oxygen scavenging material can further be a polymer having oxidizable sites in the polymer and containing a catalyst such as a transition metal salt that assists initiation of oxidation of the oxidizable sites. Such a material is particularly useful when the scavenging material forms a layer of a film.

Examples of polymers having oxidizable sites include polybutadiene or other polymers containing unsaturated sites, such as disclosed in U.S. Pat. No. 5,211,875; poly (meta-xylenediamine-adipic acid) (also known as MXD-6), disclosed in U.S. Pat. Nos. 5,021,515 and 5,049,624; and poly(ethylene-methyl acrylate-benzyl acrylate), disclosed in U.S. Ser. No. 08/091,120, now abandoned filed Aug. 12, 1993, inventors T. Ching, K. Katsumoto, S. Current and L. Theard, each of which is incorporated by reference in its entirety herein.

For sake of completeness, poly(ethylene-alkyl acrylate-benzyl acrylate) can be made, e.g., by solution transesterification. An ethylene-alkyl acrylate copolymer such as ethylene-methyl acrylate copolymer is dissolved in an appropriate solvent such as decalin, and heated to and maintained at reflux in the presence of an effective amount of a transesterification catalyst, such as tetraethyl titanate or di-butyl tin laureate, and an alcohol containing a benzyl radical, such as benzyl alcohol. The solution is then cooled, and the polymer is precipitated in methanol and dried in a vacuum oven.

An effective amount of a transition metal salt catalyst such as cobalt neodecanoate is incorporated into the precipitated polymer by melting the polymer in, for example, an extruder, and mixing the salt dissolved in a solvent such as hexane into the polymer melt.

The transesterification above may also occur using a melted ethylene-alkyl acrylate copolymer in a reactive extruder maintained at transesterification conditions and in the presence of an effective amount of a transesterification catalyst and an alcohol containing a benzyl radical. The above-described process can be used to transesterify ethylene alkyl acrylate copolymers to yield compounds suitable for use as neutralizing amine-containing polymers in this invention.

The transition-metal salt that assists initiation or catalyzes the oxidation of the oxidizable sites generally comprises an element chosen from the first, second and third transition series of the periodic table of the elements. This transition-metal salt is in a form which facilitates or imparts scavenging of oxygen by the afore-described polymers. It is generally believed that the transition-metal salt is in an ionic state such that the transition element can readily inter-convert between at least two oxidation states.

Suitable transition-metal elements include, but are not limited to, manganese II or III, iron II or III, cobalt II or III, nickel II or III, copper I or II, rhodium II, III or IV, and ruthenium. The oxidation state of the transition-metal element when introduced into the composition is not necessarily that of the active form. It is only necessary to have the transition-metal element in its active form at or shortly before the time that the composition is required to scavenge oxygen.

The transition-metal element is preferably iron, nickel or copper, more preferably manganese and most preferably cobalt.

Suitable counter-ions for the transition metal element are organic or inorganic anions. These include, but are not limited to, chloride, acetate, oleate, linoleate, caprylate, stearate, palmitate, 2-ethylhexanoate, citrate, glycolate, benzoate, neodecanoate or naphthenate. Organic anions are preferred.

Preferable salts include cobalt (II) 2-ethylhexanoate, and cobalt benzoate. More preferable salts include cobalt (II) neodecanoate, cobalt (II) oleate, cobalt (II) linoleate, and cobalt (II) caprylate.

The transition-metal element may also be introduced as an ionomer, in which case a polymeric counter-ion is employed. Such ionomers are well known in the art. See U.S. Pat. No. 3,264,272, which is incorporated by reference in its entirety.

The oxygen scavenging material comprised of a polymer and transition metal salt contains a sufficient quantity of the transition-metal salt to promote oxygen scavenging in the polymer. Generally, this requires a ratio of moles to benzyl radicals to moles of transition-metal element between about 2000:1 to about 10:1. Preferably, this molar ratio is between 200:1 and 20:1. The preferred amount of transition-metal element will typically vary with which transition-metal salt is used.

As discussed above, the oxygen scavenging material may be introduced into the system by any of a variety of techniques. For example, in forming the multi-layer structure, it can be blended into a composition for forming a layer of the structure or laminated or sprayed onto the formed layer, and/or may be a layer itself.

In particular, the oxygen scavenging material may be coated onto a polymer layer or onto a multi-layer structure, in which case the oxygen scavenging material normally forms its own layer. The particular method of introduction selected is dependent upon the particular scavenging material employed.

The oxygen scavenging material is preferably present in an amount sufficient to scavenge at least 0.1 cc $O_2$/gram of oxygen scavenging material/day. Preferably, it is capable of scavenging at least about 0.5, and more preferably at least about 1 cc $O_2$/gram of oxygen scavenging material/day.

As discussed above, the oxygen scavenging material, upon consumption of oxygen, typically produces certain by-products, e.g., volatile organic oxidation products. Examples of these oxidation by-products include carboxylic acids, such as acetic, propionic, butyric, valeric and benzoic acids; aldehydes, such as heptanal and benzaldehyde; ketones, such as acetone and methyl ethyl ketone; esters, such as methyl formate; alcohols, and the like. These by-products can cause problems.

However, the second component present in the oxygen scavenging system is a material capable of neutralizing at least a portion of the oxidation by-products produced from the reaction of oxygen with the oxygen scavenging material. Generally, the neutralizing material in the second layer comprises an acid-, alcohol- or aldehyde-reactive material. The particular material selected is dependent upon the scavenging material employed and the by-products whose migration needs to be controlled.

In particular, two types of materials have found particular utility within the present invention as being appropriate for efficient use in a separate layer, inorganic bases and organic bases.

Inorganic bases include metal oxides, hydroxides, and carbonates of Group IA and IIA elements. Examples of suitable inorganic bases include calcium carbonate, calcium hydroxide, potassium bicarbonate, and calcium oxide.

Organic bases can include any organic amine compounds including amine-containing polymers, and preferably polyamine compounds. Organic amine compounds are broadly defined as organic compounds containing at least one amine group. Amine-containing polymers are defined as organic polymers containing at least one amine group and includes grafting an amine group onto the main polymer chain. Polyamine compounds are defined as any organic polymer containing at least one amine group in each repeating unit. Preferably, the organic amine compound is a non-volatile, non-migratory compound, e.g., it does not migrate in the polymer system used.

Examples of suitable organic amine compounds include dipropylenetriamine; tris(3-aminopropylene)amine, N,N,N'N'-tetrakis(3-aminopropyl)ethylenediamine and 1,12 dodecanediamine. Examples of amine-containing polymers include glycols containing amine groups such as polyethylene glycol with two amines and polypropylene glycol with two amines, available from Texaco as Jeffamine; and dimethylaminoethanol grafted ethylene-methyl acrylate copolymers. Examples of polyamines include pentaethylene hexamine (PEHA); triethylene tetraamine; polyvinyl oxazoline; and similar higher molecular weight compounds. Such polymers can be used alone to form a film or can be reacted, blended, or mixed with a film forming polymer.

The neutralizing material is typically introduced into a thermoplastic resin such as polyethylene, ethylene vinyl acetate, or ethylene methyl acrylate, in order to improve its ease of processing. However, as long as it is in a form capable of being introduced into the system and which form does not interfere with its neutralizing functions, the method of introduction employed is not critical to the present invention.

The neutralizing materials are present in an amount which is effective to remove at least a portion of the oxidation by-products or prevent such products from passing through. Preferably, it is present in an amount to significantly reduce or eliminate migration of such by-products.

When employed with thermoplastic resins as discussed above, an effective amount of the neutralizing material is typically from about 0.05–40% by weight based on the second layer, depending on the particular neutralizing agent. For example, where organic bases such as polyamine compounds are employed, the preferred amount is between about 0.05 and 40% by weight based on the second layer.

The exact arrangement of the layers of the two components is not critical to the present invention as long as the oxidation by-products will come into contact with the neutralizing material and thereby have their migration controlled.

It is preferred that the two layers be adjacent to each other. When used in a package, it is preferable that the neutralizing material be positioned between the contents of the package and the oxygen scavenging material, and therefore interim to the oxygen scavenging containing layer.

In one particular embodiment of the present invention, the two components are present in separate layers of a multi-layer film. The multi-layer structure of the present invention includes at least two layers:

(a) a first layer comprising an oxygen scavenging material; and (b) a second layer comprising at least one oxidation by-product neutralizing material.

The multi-layer structure can include more than one of these neutralizing layers. Although the arrangement of these layers is not critical to the present invention, in order to improve its efficiency in preventing the migration of by-products into the interior of the package, as mentioned above, the second layer should be located between the first layer and the interior of the package.

Preferably, this second layer is provided in conjunction with one or more additional layers, e.g., oxygen barrier layers or polymeric selective barrier layers that also serve to aid in preventing the undesirable migration of the by-products into the package.

Such layers can include one or more of:

(1) An oxygen barrier layer which is typically an "outside" layer and comprises a material which effectively functions as a physical barrier to oxygen, thus minimizing or even eliminating any diffusion of oxygen into the resulting package. The presence of such an oxygen barrier can supplement the efforts of the neutralizing materials and therefore may reduce the amount of neutralizing material needed.

Although well recognized in the art, such layers typically have an OTR (oxygen transmission rate) of no more than about 1 cc $O_2$/100 in.$^2$ of oxygen barrier layer/day/atm.

(2) A polymeric selective barrier layer as mentioned previously.

For sake of completeness, the polymeric selective barrier layer functions as a selective barrier to certain oxidation products but not to oxygen. In one preferred embodiment, a layer is considered to be a polymeric selective barrier layer when it prevents at least about half of the number and/or amount of oxidation products having a boiling point of at least about 75° C. from passing through the polymeric selective barrier layer from the layer carrying the organic oxygen-scavenging material.

Polymeric selective barrier layers are typically located between the oxygen scavenging layer and the "inside" of the resulting package to prevent migration of the oxidation products into the package.

In fact, although the exact arrangement of these by-product blocking layers is not critical to the present invention, it is preferred that both the second neutralizing material layer(s), 4, and polymeric selective barrier layer(s), 3, be located between the oxygen scavenging layer, 2, and the interior of the package. Further, the oxygen barrier layer, 1, is typically located exterior of the oxygen scavenging layer. Such an arrangement is illustrated in the drawing FIGURE.

(3) As further illustrated in the FIGURE, the multi-layer film according to the present invention can further include a sealing layer, 5, which is preferably the innermost layer relative to the package formed therefrom. This layer preferably comprises a heat sealable material.

Optionally, where, for example, the second layer is the innermost layer, the heat sealable material can be further included within the second layer containing the neutralizing materials.

The multi-layer film according to the present invention can be produced by conventional techniques, e.g., melt extrusion, co-extrusion, or lamination, which are well recognized in the art. As such, they need not be described in detail here.

Moreover, the multi-layer film according to the present invention can be preferably employed in the production of packages, e.g., both rigid and flexible food packages, in the same manner as traditional multi-layer films. In a preferred embodiment, the packaging and multi-layer film is UV transparent, in order to allow sufficient UV radiation to be transmitted to the preferred oxygen scavenging materials of the present invention. The preferred oxygen scavenging materials are UV activated and therefore a UV transparent package is critical to the system working. It is also preferred, particularly for food packaging, that the package be optically clear.

The use of the neutralizing material in accordance with the present invention is capable of removing a variety of the oxidation by-products produced by the oxygen scavenging layer, particularly those odorous by-products. It is important, however, that the neutralizing material of the present invention be kept in a layer separate to that of the oxygen scavenging material in order to avoid inhibition of the oxidation reaction. The efficiency of the present invention in removing these by-products is particularly apparent when employed in combination with the polymeric selective barrier layer in a multi-layer film.

The oxygen scavenging system of the present invention can find broad utility with a variety of oxygen sensitive materials. Such materials include, in addition to food, cosmetics and beauty products, other oxygen sensitive chemicals and electronic materials.

For example, in a packaging environment, in addition to being present as a film which forms at least a portion of the package, it can be found in virtually any part of a packaging material which will come into contact with the interior of the package. Such environments include but are not limited to cap liners for bottles and the like, trays, e.g., those trays used in the food industry, packaging materials for cosmetic or other materials in the beauty industry, as well as other chemical environments.

The present invention will now be discussed in terms of certain examples, it being understood that such examples are solely illustrative in nature and in no way limit the present invention.

EXAMPLES

Examples 1–4

Examples 1–4 are of three layer structures having a A/B/A arrangement at 1:1:1 thickness with a total thickness of 3 mils. In each case, A is ethylene methyl acrylate copolymer, EMAC® SP-2260, with the named additive, and B is ethylene methyl acrylate benzyl acrylate copolymer containing 1000 ppm of cobalt in the form of cobalt neodecanoate.

| Example | Additive | Odor |
| --- | --- | --- |
| 1 Control | None | acetic |
| 2 | 2% PEHA polyamine | weak acetic with amine smell |
| 3 | 0.5% PEHA polyamine | — |
| 4 | 2% calcium carbonate | weaker acetic |

All films were irradiated for 5 minutes under a UV blackray (250 nm) at a 5-inch distance. The oxygen scavenging resins were sealed in one-liter size bottles and oxygen uptakes were monitored by Mocon 710 oxygen meter for 30–40 days using 2 gram samples. At the end of the oxygen uptake of about 100 cc/gram resins, the bottles were opened and odor evaluated by a panel of at least 3 people. The results are set forth in the foregoing table.

Based upon the foregoing results, it can be concluded that a small amount of neutralizing agent in a separate layer is able to significantly reduce undesirable acetic smell after the products were extensively oxidized. Since a polymer selective barrier can be inserted and real application conditions involve reduced oxygen (<2% $O_2$ after nitrogen flush compared to 20% in the present examples), the present invention is expected to significantly reduce by-product odor.

Example 5

A multi-layer film construction was made having from the outer most layer to the inner most layer (i.e., that to be generally adjacent to foods) the following layers:

(1) a 0.16 mil thick aluminum foil oxygen barrier layer;
(2) a 1 mil thick EBZA oxygen scavenging polymer with 750 ppm of Cobalt in the form of cobalt neodecanoate salt;
(3) a 0.5 mil thick oriented PET functional barrier layer; and
(4) a 1.0 mil thick EMAC 2205 containing 2% of calcium carbonate as the neutralization layer as well as heat seal layer.

The films were UV irradiated from the inside layer out as described in accordance with Examples 1–4 and 9" by 9" bags are made by heat sealing two pieces of the multilayer construction together. The bags were then inflated to contain 1 liter fresh air by a syringe. The oxygen content was monitored by a Mocon 710 oxygen meter.

At the end of 4 weeks, 80% of the oxygen was consumed and the bag was opened slowly for odor evaluation as described in accordance with Examples 1–6.

A control construction containing identical layers, except no calcium carbonate was used in the EMAC layer, was also tested. The control gave a strong acidic smell. The opened bag of the present invention gave no detectable acidic odor.

This example further demonstrates the effectiveness of the present invention in controlling odor even though the neutralizer layer is separate from the oxygen scavenging polymer.

Example 6

This example demonstrates the use of an amine-containing polymer in odor removal. Ester exchange of EMAC with N,N-dimethylethanolamine was conducted in a twin screw extruder by reacting 4.5 Kg/hr EMAC® SP 2260 containing 24% by weight methylacrylate and having a melt index of 2, 1.13 Kg/hr N,N-dimethylethanolamine, and 45 cc/hr titanium tetraethoxide at 210° C. The conversion was 22.1% to N,N-dimethylethyl ester of acrylate.

A two-layer film structure with a total thickness of 4–5 mil was prepared by coextrusion of the above amine-containing polymer and EBZA (47.2% conversion) containing 1000 ppm cobalt, in the form of cobalt neodeconate. The two-layer film was aged in a one-liter bag (21% oxygen) at room temperature for about one month. The bag was opened and the odor compared by a three-judge panel. The odor was slightly less acidic than the monolayer film without the amine-containing polymer.

Principles, preferred embodiments, and modes of operation of the present invention have been described by the foregoing. The invention is not to be limited by particular embodiments disclosed since they are only illustrative in scope.

Various modifications, substitutions, omissions, and the like, may be made without departing from the spirit of the invention. Accordingly, it is intended that the scope of the present invention be limited solely by the scope of the following claims including equivalents thereof.

What is claimed is:

1. An optically-clear and UV transparent multi-layer film structure useful in the packaging of an oxygen sensitive material, the structure comprising;

(a) a first layer comprised of an oxygen scavenging material selected from the group consisting of (I) unsaturated organic oxidizable materials and (ii) polymeric materials having oxidizable sites and transition metal salt catalysts, and which forms at least one organic by-product upon the reaction thereof with oxygen;

(b) a second layer separate from the first comprised of an effective amount of by-product complexing material selected from the group consisting of inorganic bases and organic bases, the second layer being located between the first layer and the interior area enclosed by the multi-layer structure, and the by-product complexing material being capable of reacting with and complexing with by-products of the reaction of oxygen with the oxygen scavenging material to prevent the by-products from passing into the interior area;

(c) an oxygen barrier layer located outside of the first layer and forming an exterior surface of the multi-layer structure; and (d) a polymeric selective barrier layer which is located between the first layer and the interior area enclosed by the multi-layer structure.

2. The multi-layer structure of claim 1, wherein the transition-metal salt catalyst is cobalt (II) neodecanoate, cobalt (II) oleate, cobalt (II) linoleate, or cobalt (II) caprylate.

3. The multi-layer structure of claim 1, wherein the second layer further comprises a thermoplastic resin.

4. The multi-layer structure of claim 1, wherein the by-product complexing material is selected from the group consisting of calcium oxide, calcium hydroxide, potassium bicarbonate and calcium carbonate.

5. The multi-layer structure of claim 1, wherein the structure further comprises a seal layer forming an interior surface of the multi-layer structure, the interior surface being exposed to the interior area enclosed by the multi-layer structure.

6. The multi-layer structure of claim 1, wherein the inorganic base is selected from the group consisting of calcium oxide, calcium hydroxide, and calcium carbonate.

7. The multi-layer structure of claim 1, wherein the organic base comprises an organic amine compound.

8. The multi-layer structure of claim 7, wherein the organic amine comprises an amine-containing polymer.

9. The multi-layer structure of claim 7, wherein the organic amine compound comprises a polyamine compound.

10. The multi-layer structure of claim 9, wherein the polyamine compound is selected from the group consisting of pentaethylene hexamine, triethylene tetraamine, and polyvinyl oxazoline.

11. A package suitable for holding an oxygen scavenging material comprising a multi-layer structure, wherein the multi-layer structure is that structure according to claim 1.

12. The package according to claim 11, further comprising at least one of a chemical material, or an electronic component located therein.

13. The package according to claim 11, further comprising a food product or cosmetic product located therein.

14. The package according to claim 11, wherein the multi-layer structure is a film which forms at least a portion of the package.

15. The package according to claim 11, wherein the multi-layer structure is a film which is present within the package.

16. The package according to claim 11, wherein the package, together with the multi-layer structure, is optically clear and UV transparent.

17. An article for packaging an oxygen sensitive material, wherein the article comprises a packaging component selected from the group consisting of coatings, bottle cap liners, adhesive or non-adhesive inserts, sealants, gaskets and fibrous mat inserts; and wherein the packaging component comprises a UV transparent and optically clear multi-layer film structure, the multi-layer structure comprising:

(a) a first layer comprised of an oxygen scavenging material selected from the group consisting of (I) unsaturated organic oxidizable materials and (ii) polymeric materials having oxidizable sites and transition metal salt catalysts, and which forms at least one organic by-product upon the reaction thereof with oxygen;

(b) a second layer separate from the first comprised of an effective amount of by-product complexing material selected from the group consisting of inorganic bases and organic bases, the second layer being located between the first layer and the interior area enclosed by the multi-layer structure, and the by-product complexing material being capable of reacting with and complexing with by-products of the reaction of oxygen with the oxygen scavenging material to prevent the by-products from passing into the interior area;

(c) an oxygen barrier layer located outside of the first layer and forming an exterior surface of the packaging component; and (d) a polymeric selective barrier layer which is located between the first layer and the interior area enclosed by the article.

* * * * *